H. A. HUNTER.
TRACTION TREAD FOR WHEELS.
APPLICATION FILED MAR. 26, 1921.
1,419,503. Patented June 13, 1922.
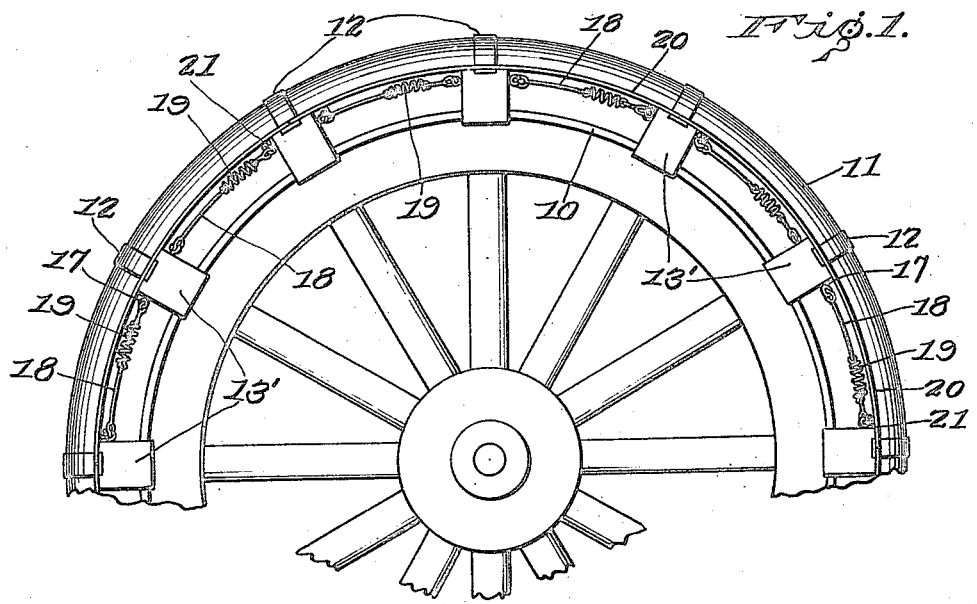
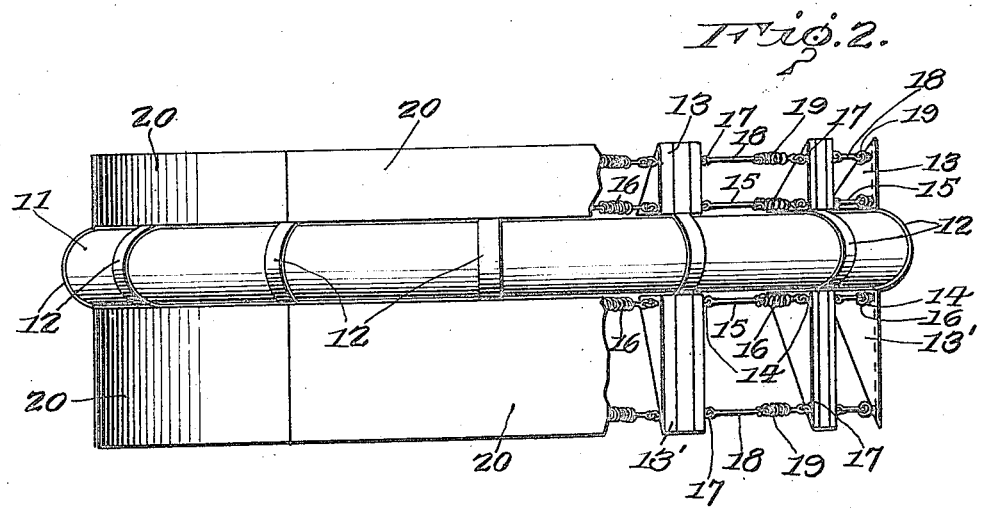
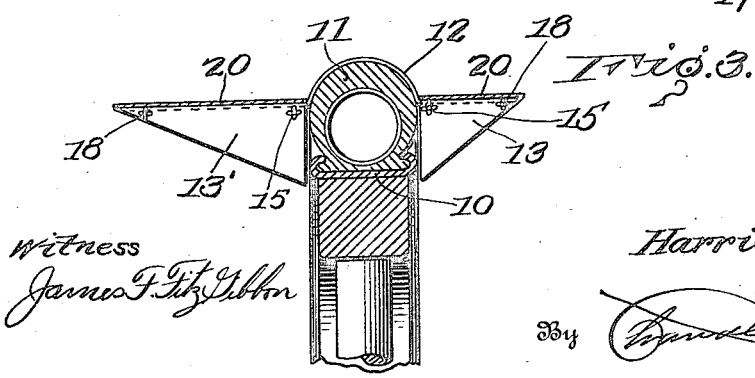
Inventor
Harrison A. Hunter.
Witness
James F. FitzGibbon
By
Attorneys.

UNITED STATES PATENT OFFICE.

HARRISON A. HUNTER, OF MANKATO, KANSAS.

TRACTION TREAD FOR WHEELS.

1,419,503.           Specification of Letters Patent.    Patented June 13, 1922.

Application filed March 26, 1921. Serial No. 455,929.

*To all whom it may concern:*

Be it known that I, HARRISON A. HUNTER, a citizen of the United States, residing at Mankato, in the county of Jewell, State of Kansas, have invented certain new and useful Improvements in Traction Treads for Wheels; and I do hereby declare the following to be a full, clear, and exact description of the invention, such as will enable others skilled in the art to which it appertains to make and use the same.

This invention relates to new and useful improvements in attachments for automobile wheels, and particularly to traction attachments therefor.

One object of the invention is to provide a traction attachment for an automobile wheel which will prevent the wheel from sinking into soft and deep mud, snow, or sand.

Another object is to provide a device of this character which is constructed in sections to permit the easy and quick attachment or detachment of the same, and whereby when the wheels are in the mud, a portion of the tread can be attached to the upper portion of the wheel and then the wheel rotated to permit the other sections to secured in place.

Other objects and advantages will be apparent from the following description when taken in connection with the accompanying drawing.

In the drawing:

Figure 1 is a side elevation of a portion of an automobile wheel equipped with the invention.

Figure 2 is an edge view looking down onto the tire and tread attachment.

Figure 3 is a vertical transverse sectional view through a portion of a wheel and the traction attachment, showing certain of the supporting blocks in side elevation.

Referring particularly to the accompanying drawing, 10 represents the rim and 11 the tire of an automobile wheel in connection with which the invention is used. Disposed across the tread of the tire 11 is a plurality of metal straps 12, each having its ends extending horizontally away from the opposite sides of the wheel. Disposed against each side of the tire, and rim, of the wheel, is a triangular block of wood, or other suitable material, 13, the base of the triangular block being disposed against the side of the tire and rim, as shown in the sectional view, Figure 3. The outward extending ends of the metal straps 12 are secured to the horizontal faces of the blocks 13 and 13' respectively. It will be noted that the block 13', to distinguish the same from the other block, and which is located at the outer side of the wheel, is somewhat longer than the other one. At the inner ends of the blocks 13 and 13' and from opposite faces of the latter, there project the eyes or loops 14. With a loop 14 of one face of the block is connected a rod 15, to the other end of which is connected a helical spring 16 and to this helical spring 16, there is connected in turn a snap fastener 16' which is removably engaged with the loop or eye 14 of the opposed face of the next corresponding block. Additional loops 17 are carried by the opposite faces of the blocks adjacent their outer ends. With the loops 17 of one face of a block, is connected a rod 18 having connected to its opposite end a helical spring 19 to which, in turn, is connected a snap fastener that is removably engaged with the loop or eye 14 of the opposed face of the next block, these snap fasteners permitting the sections to be readily and easily taken apart or put together as conditions may dictate.

Also secured to the horizontal faces of the triangular blocks 13 and 13' are the circumferentially extending flat metal plates 20, each of said plates being of such a length as to extend between and be secured to a certain number of the blocks 13 and 13', whereby the auxiliary tread or traction member is composed of detachable sections.

It will be noted that the plates which are carried by the outer blocks 13' are wider than those carried by the blocks 13, which provides a very broad tread for the wheel, and effectively prevents sinking into the mud of a road. With such an equipment on each of the wheels of an automobile, it is easy to travel over muddy roads, the treads preventing the wheels sinking into deep mud.

To remove the device from the wheel, it is only necessary to detach the fasteners 21, when the sections will fall loosely from the wheel.

By forming the device in detachable sections, when the wheels of an automobile have sunk in the mud, a number of sections can be attached to the upper portion of the wheel, and then the wheels turned to bring these tread members of sections down into the mud, thus permitting the remainder to be attached to the wheel.

What is claimed is:

1. The combination with a vehicle wheel of a removable traction tread wheel comprising a plurality of transverse arcuate straps arranged across the tread of the wheel and having their ends extended oppositely therefrom, tread plates secured to the extensions of the straps, triangular blocks disposed with their bases against the opposite sides of the wheel and their apexes directed away from the wheel, said blocks being secured to the extensions of the straps, and flexible contractile connecting and spacing means between the blocks.

2. A removable traction tread for an automobile, in combination with the tire and rim of the wheel, comprising parallel and circumferentially extending rows of triangular blocks with their bases disposed against the tire and rim, each block having oppositely directed pairs of loops, links connected to the loops and extending between the pairs of blocks, springs between certain of the links and loops, separable fasteners between certain links and loops, connecting members between the blocks disposed transversely of the tread of the tire of the wheel, the ends of the straps being extended horizontally and secured to the opposite blocks of the series, and a plurality of tread plates secured to the outer faces of the blocks, in such relation to groups thereof that the tread is divided into sections.

In testimony whereof, I affix my signature, in the presence of two witnesses:

HARRISON A. HUNTER.

Witnesses:
D. H. STAFFORD,
A. R. WILEY.